United States Patent
Lan et al.

(10) Patent No.: US 12,454,205 B2
(45) Date of Patent: Oct. 28, 2025

(54) SHOULDER ADJUSTING MECHANISM FOR SEAT BACKREST

(71) Applicant: Yanfeng International Automotive Technology Co., Ltd., Shanghai (CN)

(72) Inventors: Shunqiang Lan, Shanghai (CN); Xun Tang, Shanghai (CN); Yueyun Chen, Shanghai (CN); Jie Liang, Shanghai (CN); Yiliang Xu, Shanghai (CN)

(73) Assignee: Yanfeng International Automotive Technology Co., Ltd., Shanghai (CN)

( * ) Notice: Subject to any disclaimer, the term of this patent is extended or adjusted under 35 U.S.C. 154(b) by 129 days.

(21) Appl. No.: 18/560,581

(22) PCT Filed: Jun. 6, 2022

(86) PCT No.: PCT/CN2022/097215
§ 371 (c)(1),
(2) Date: Nov. 13, 2023

(87) PCT Pub. No.: WO2022/257896
PCT Pub. Date: Dec. 15, 2022

(65) Prior Publication Data
US 2024/0253536 A1 Aug. 1, 2024

(30) Foreign Application Priority Data
Jun. 11, 2021 (CN) .......................... 202121319747.5

(51) Int. Cl.
*B60N 2/22* (2006.01)
*B60N 2/23* (2006.01)
*B60N 2/28* (2006.01)

(52) U.S. Cl.
CPC ........... *B60N 2/2222* (2013.01); *B60N 2/233* (2013.01)

(58) Field of Classification Search
CPC .............................. B60N 2/2222; B60N 2/233
See application file for complete search history.

(56) References Cited

U.S. PATENT DOCUMENTS 10,457,167 B2   10/2019   Mochizuki et al.

FOREIGN PATENT DOCUMENTS

| CN | 207190864 U | 4/2018 |
|---|---|---|
| CN | 108394323 A | 8/2018 |

(Continued)

OTHER PUBLICATIONS

International Search Report and Written Opinion of the International Searching Authority mailed on Jul. 29, 2022, for PCT Application No. PCT/CN2022/097215, filed on Jun. 6, 2022, 17 pages (with English Translation).

(Continued)

*Primary Examiner* — Anthony D Barfield
(74) *Attorney, Agent, or Firm* — Cooley LLP

(57) ABSTRACT

The present disclosure relates to a shoulder adjustment mechanism for a seat backrest, comprising: an upper backrest frame (10) and a lower backrest frame (20) in an up-and-down arrangement, each of the upper backrest frame (10) and the lower backrest frame (20) including a first side and a second side opposing to each other in a left-right direction, a third side facing a seat, and a fourth side facing away from the seat; a pair of first hinges (30) hingedly connected to the first sides and the second sides of the upper backrest frame (10) and the lower backrest frame (20) and close to the third sides; a pair of second hinges (40) hingedly connected to the first sides and the second sides of the upper backrest frame (10) and the lower backrest frame (20) and close to the fourth sides, the lower backrest frame (20) being provided with sliding grooves (200); a first base (50) fixed to the lower backrest frame (20); a first transmission struc- (Continued)

ture (60) rotatably mounted on the first base (50) and in driving connection with a motor, wherein a spacing exists between a rotating position of the first transmission structure (60) and a fixed position of the first base (50); a first lead screw (70) in transmission connection with the first transmission structure (60) and connected with the second hinge (40), wherein the motor drives the first lead screw (70) to move through the first transmission structure (60), thereby bringing the second hinges (40) to move in the sliding grooves (200).

9 Claims, 11 Drawing Sheets

(56) References Cited

FOREIGN PATENT DOCUMENTS

| | | | |
|---|---|---|---|
| CN | 209257942 U | 8/2019 | |
| CN | 209365954 U | 9/2019 | |
| CN | 111186345 A | 5/2020 | |
| CN | 215590552 U | 1/2022 | |
| CN | 114013350 A | 2/2022 | |
| EP | 2233346 A2 * | 9/2010 | ........... B60N 2/2222 |
| EP | 2233346 B1 | 8/2019 | |
| KR | 1470216 B1 * | 12/2014 | ........... B60N 2/2222 |
| WO | WO-9858815 A1 * | 12/1998 | ........... B60N 2/2222 |

OTHER PUBLICATIONS

Extended European Search Report for European Application No. 22819494.0 mailed May 13, 2025, 6 pages.

* cited by examiner

SHOULDER ADJUSTING MECHANISM FOR SEAT BACKREST

RELATED APPLICATIONS

This application is a national stage of International Application No. PCT/CN2022/097215, filed Jun. 6, 2022, which claims priority to Chinese Patent Application No. 202121319747.5, filed Jun. 11, 2021. Both of the aforementioned applications are hereby incorporated by reference in their entireties.

TECHNICAL FIELD

The present disclosure relates to the field of automobile seats, in particular, to shoulder adjustment mechanisms for seat backrests.

BACKGROUND ART

With the development of the automobile industry and the changes in the automobile market, in order to improve user experiences, more and higher demands are put forward for functions and comfortability of the automobile.

Referring to FIG. 1, a structural schematic view of a shoulder adjustment mechanism for a seat backrest in the prior art is shown. Referring to FIG. 2, a front view of the shoulder adjustment mechanism for a seat backrest in the prior art is shown. As shown in FIG. 1 and FIG. 2, a motor 10a is adopted to drive a main movement pair 20a to move up and down and meanwhile rotate about a bolt fixing point 30A, to thereby realize adjustment of the shoulder. The mounting point and rotating point of the shoulder adjustment mechanism in the prior art are at the same point 30a, and the movement stroke for shoulder adjustment depends on the length b of the lead screw, so the movement stroke is difficult to increase. If it is expected to increase the movement stroke for shoulder adjustment, the shoulder adjustment mechanism needs to be made larger, which may lead to large occupation space, high cost and poor applicability of the shoulder adjustment mechanism.

CONTENT OF THE INVENTION

An object of the present disclosure is to overcome the shortcomings in the prior art, by providing a shoulder adjustment mechanism for a seat backrest to solve the problem that the movement stroke of the shoulder adjustment mechanism is difficult to increase in the prior art.

The aforesaid object is achieved by the following technical solution:

The present disclosure provides a shoulder adjustment mechanism for a seat backrest, comprising:
an upper backrest frame and a lower backrest frame in an up-and-down arrangement, each of the upper backrest frame and the lower backrest frame including a first side and a second side opposing to each other in a left-right direction, a third side facing a seat, and a fourth side facing away from the seat;
a pair of first hinges hingedly connected to the first sides and the second sides of the upper backrest frame and the lower backrest frame and close to the third sides;
a pair of second hinges hingedly connected to the first sides and the second sides of the upper backrest frame and the lower backrest frame and close to the fourth sides, the lower backrest frame being provided with sliding grooves for allowing movement of the second hinges;
a first base fixed to the first side of the lower backrest frame;
a first transmission structure rotatably mounted on the first base and in driving connection with a motor, wherein a spacing exists between a rotating position of the first transmission structure and a fixed position of the first base;
a first lead screw in transmission connection with the first transmission structure, wherein a top portion of the first lead screw is connected with one of the second hinges, and wherein the motor drives the first lead screw to move up and down through the first transmission structure, and accordingly the first lead screw brings the second hinges to move in the sliding grooves, thus realizing rotation of the upper backrest frame about the first hinges relative to the lower backrest frame.

A further improvement to the shoulder adjustment mechanism for a seat backrest according to the present disclosure lies in that:
the first base is provided with a first transverse hole in a transverse direction;
the first base is provided with a first rotating shaft located on a rim of the first transverse hole;
the first transmission structure is placed within the first transverse hole, and an edge of the first transmission structure is in rolling connection with the first rotating shaft.

A further improvement to the shoulder adjustment mechanism for a seat backrest according to the present disclosure lies in that:
the first base is provided with a first vertical hole in a vertical direction and communicating with the first transverse hole;
the first transmission structure is provided with a first insertion hole in a vertical direction, and when the first transmission structure is placed within the first transverse hole, the first insertion hole and the first vertical hole correspondingly communicate with each other;
the first lead screw penetrates through and placed within the first insertion hole and the first vertical hole.

A further improvement to the shoulder adjustment mechanism for a seat backrest according to the present disclosure lies in that:
a first nut for limiting position is threadedly connected to a bottom end of the first lead screw.

A further improvement to the shoulder adjustment mechanism for a seat backrest according to the present disclosure lies in that:
the first transmission structure is a first worm-gear structure.

A further improvement to the shoulder adjustment mechanism for a seat backrest according to the present disclosure lies in that, the shoulder adjustment mechanism further comprises:
a second base fixed to the second side of the lower backrest frame;
a second transmission structure rotatably mounted on the second base, wherein a spacing exists between a rotating position of the second transmission structure and a fixed position of the second base;
a transverse shaft transversely connected between the first transmission structure and the second transmission structure;

a second lead screw in transmission connection with the second transmission structure, wherein a top portion of the second lead screw is connected with another one of the second hinges.

A further improvement to the shoulder adjustment mechanism for a seat backrest according to the present disclosure lies in that:

the second base is provided with a second transverse hole in a transverse direction;

the second base is provided with a second rotating shaft located on a rim of the second transverse hole;

the second transmission structure is placed within the second transverse hole, and an edge of the second transmission structure is in rolling connection with the second rotating shaft.

A further improvement to the shoulder adjustment mechanism for a seat backrest according to the present disclosure lies in that:

the second base is provided with a second vertical hole in a vertical direction and communicating with the second transverse hole;

the second transmission structure is provided with a second insertion hole in a vertical direction, and when the second transmission structure is placed within the second transverse hole, the second insertion hole and the second vertical hole correspondingly communicate with each other;

the second lead screw penetrates through and placed within the second insertion hole and the second vertical hole.

A further improvement to the shoulder adjustment mechanism for a seat backrest according to the present disclosure lies in that:

a second nut for limiting position is threadedly connected to a bottom end of the second lead screw.

A further improvement to the shoulder adjustment mechanism for a seat backrest according to the present disclosure lies in that:

the second transmission structure is a second worm-gear structure.

The shoulder adjustment mechanism for a seat backrest according to the present disclosure is beneficial in that:

The seat backrest disclosed in the present disclosure comprises an upper backrest frame and a lower backrest frame in an up-and-down arrangement and hinged together, and a motor is used as a driving source to drive the first transmission structure to move the first lead screw up and down, and the lead screw brings the upper backrest frame into rotation relative to the lower backrest frame to thereby achieve adjustment of the shoulder.

In the present disclosure, a spacing exists between the rotating position of the first transmission structure and the fixed position of the first base (that is, the rotating point of the first transmission structure is separate from the mounting and fixing point of the first base), and the first lead screw passes through the first transmission structure. In this way, if the stroke needs to be increased, the base and the first transmission structure may not be affected, and there is only a need to increase the length of the first lead screw without increasing the volume of the first transmission structure. This makes the shoulder adjustment mechanism according to the present disclosure adaptable to different stroke requirements and have saved space and stronger applicability and can achieve the function of shoulder adjustment. In addition, the length of the lead screw can also be adjusted to meet different requirements for different movement strokes of the shoulder adjustment mechanism.

DETAILED EMBODIMENTS

The present disclosure will be further described with reference to the attached drawings and specific embodiments.

Figure 1:
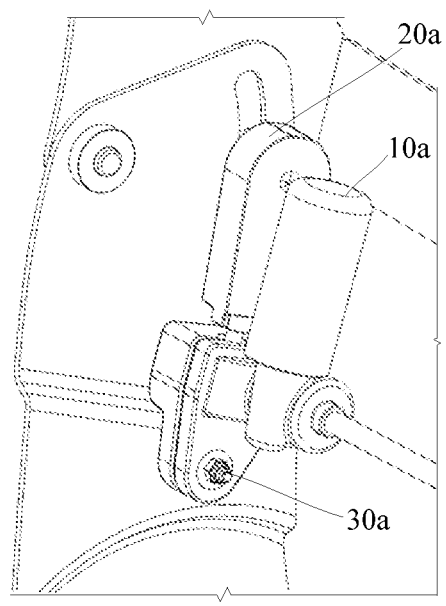
FIG. 1 is a structural schematic view of a shoulder adjustment mechanism for a seat backrest in the prior art.
Figure 2:
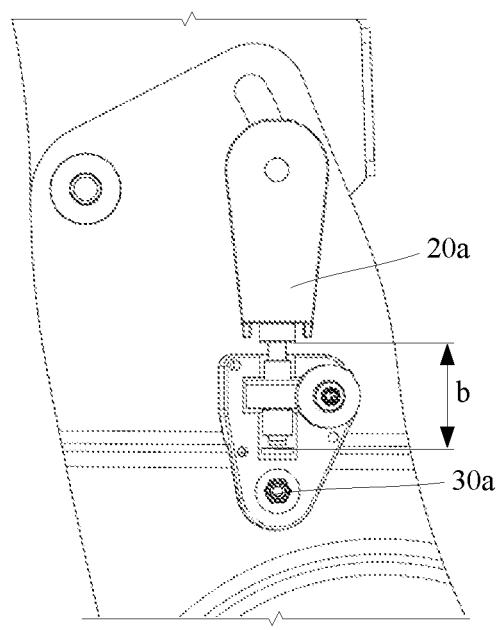
FIG. 2 is a front view of the shoulder adjustment mechanism for a seat backrest in the prior art.
Figure 3:
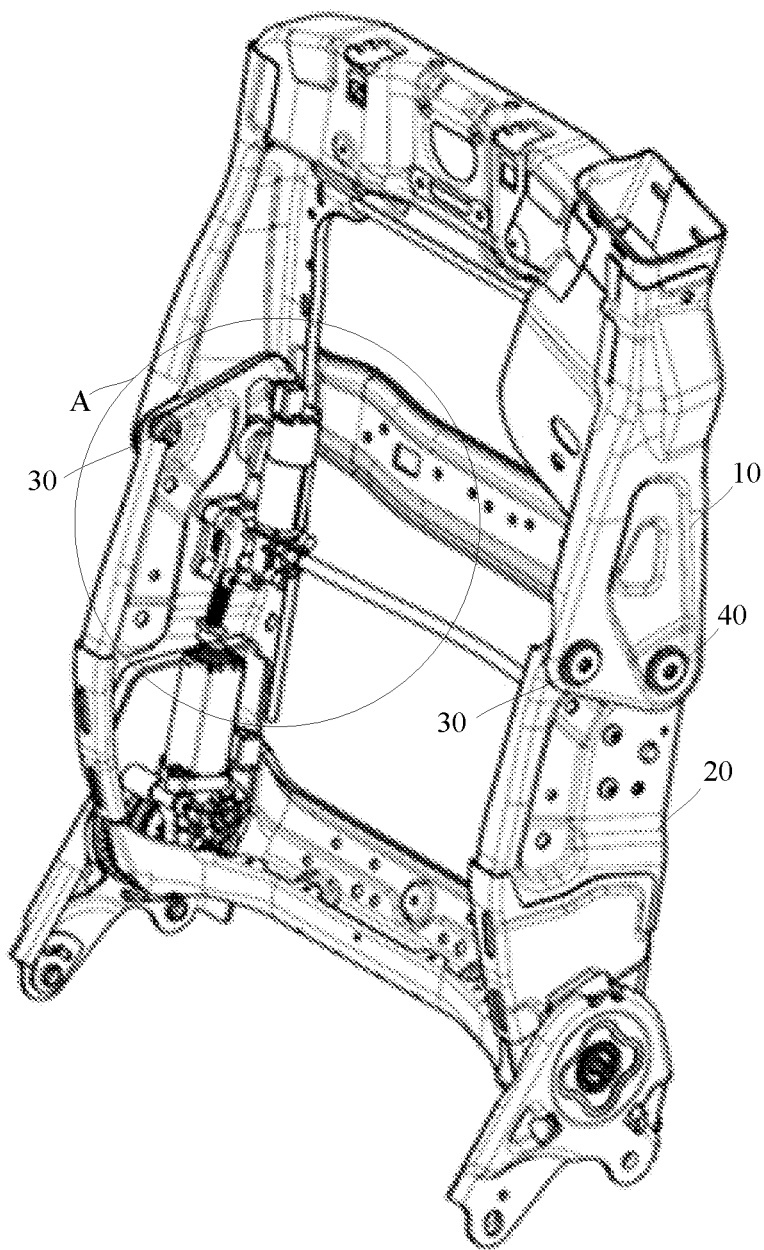
FIGS. 3 and 4 are schematic views of the shoulder adjustment mechanism for a seat backrest according to the present disclosure before and after adjustment.
Figure 4:
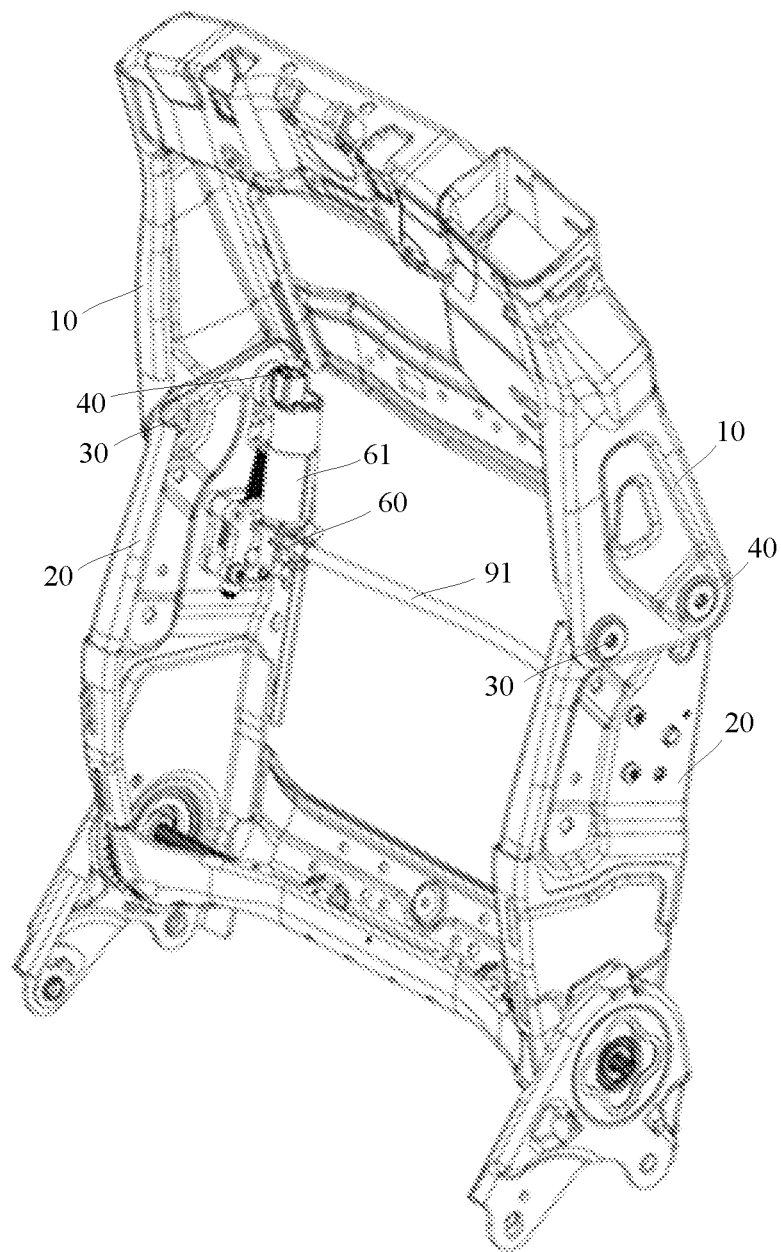
Figure 5:
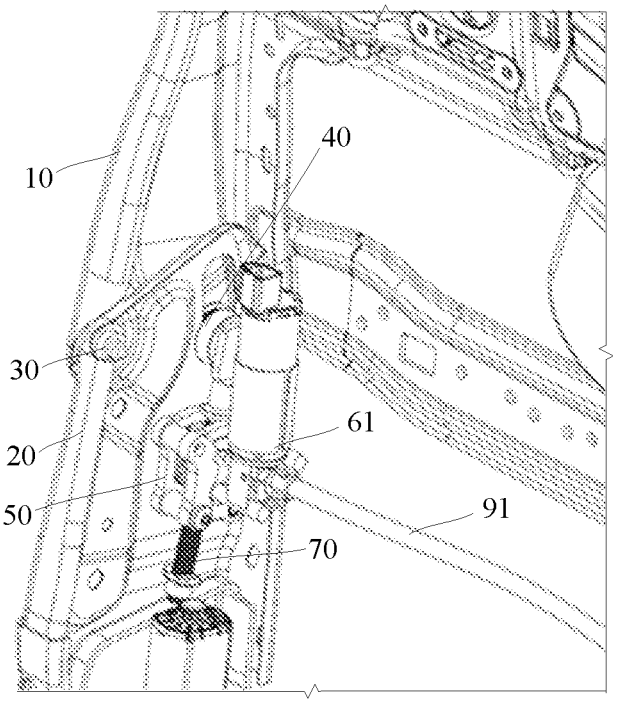
FIGS. 5, 6 and 7 are enlarged views of Part A of FIG. 3 in three adjustment states.
Figure 6:
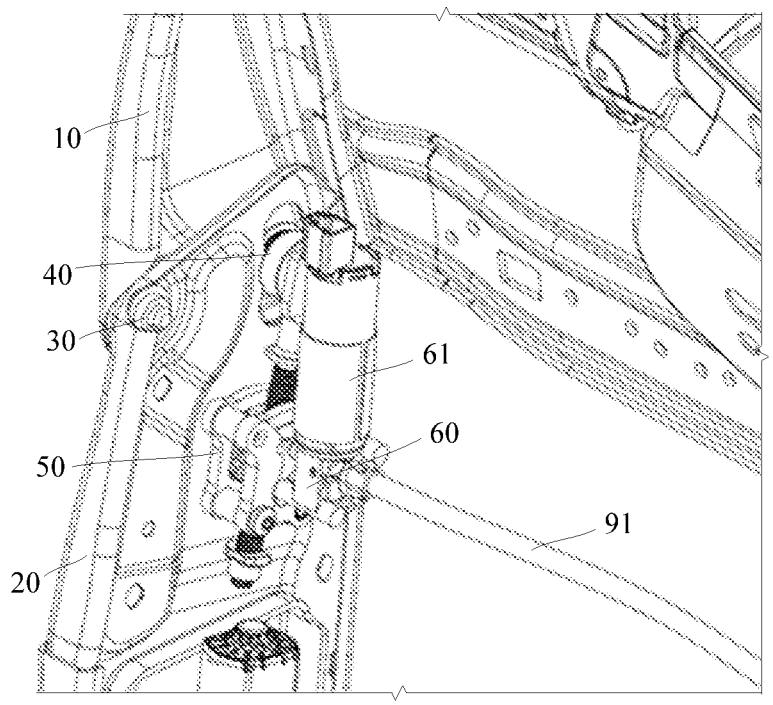
Figure 7:
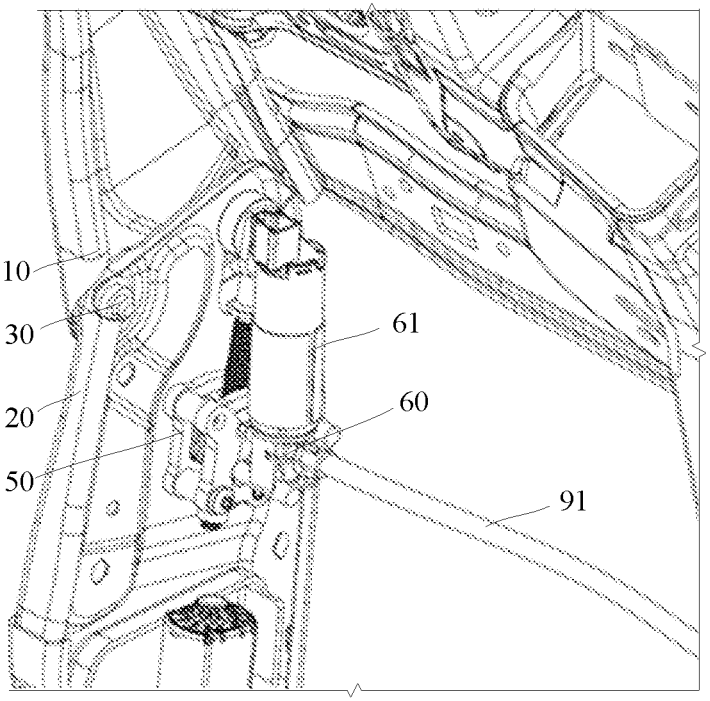
Figure 8:
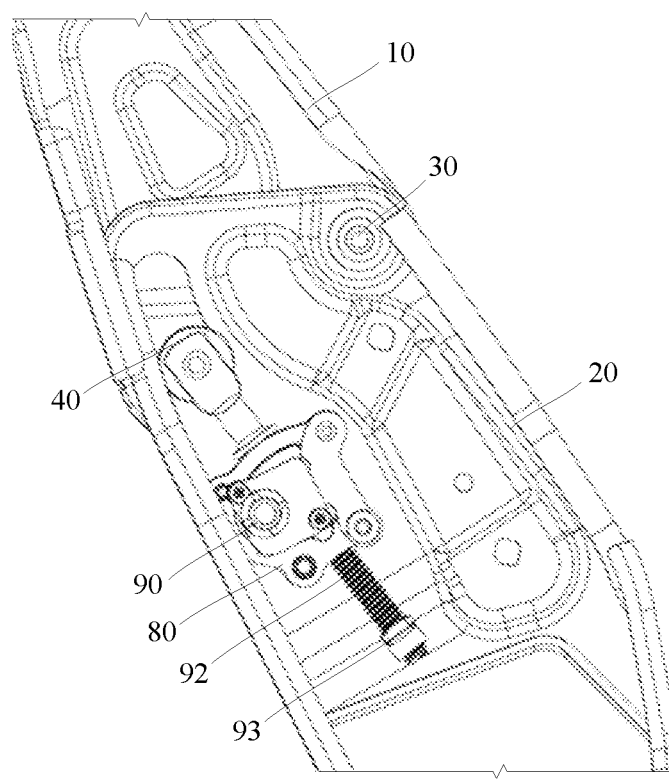
FIGS. 8, 9 and 10 are side views of the opposite side of Part A of FIG. 3 in the three adjustment states.
Figure 9:
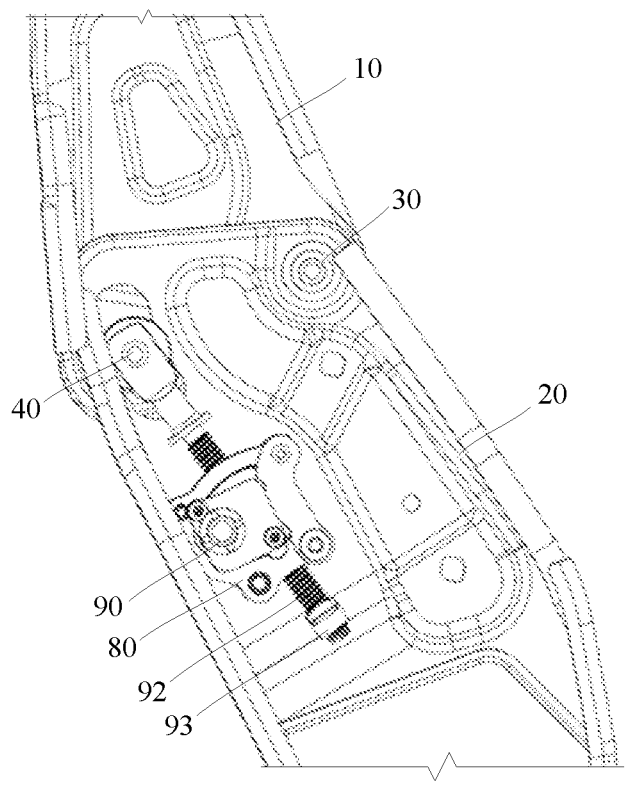
Figure 10:
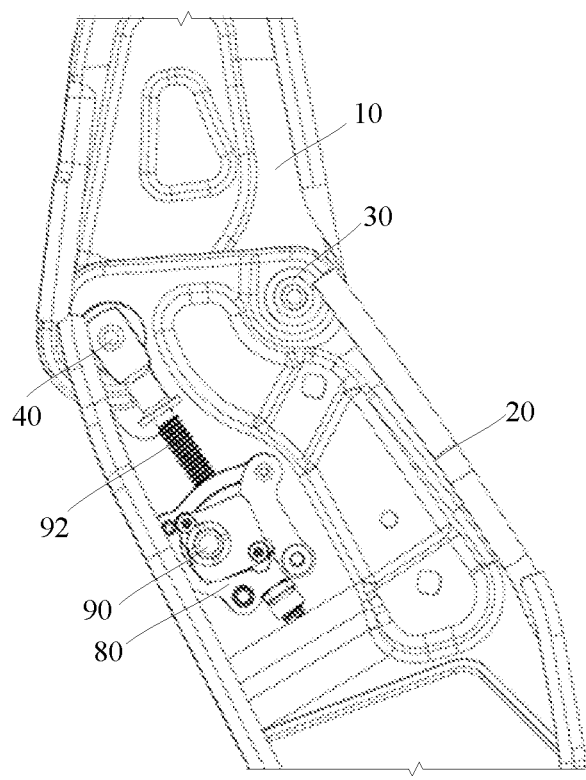
Figure 11:
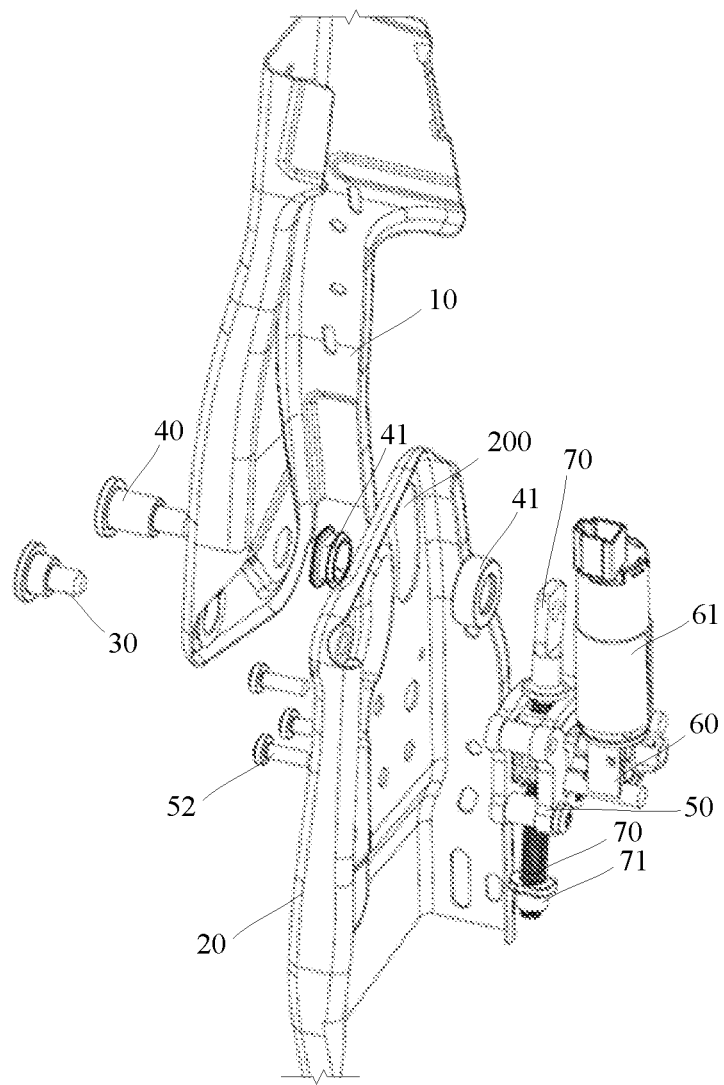
FIG. 11 is an exploded schematic view of the shoulder adjustment mechanism for a seat backrest according to the present disclosure.

Refer to FIGS. 3 and 4, which are schematic views of the shoulder adjustment mechanism for a seat backrest according to the present disclosure before and after adjustment. FIGS. 5, 6 and 7 are enlarged views of Part A of FIG. 3 in three adjustment states. FIGS. 8, 9 and 10 are side views of the opposite side of Part A of FIG. 3 in the three adjustment states. FIG. 11 is an exploded schematic view of the shoulder adjustment mechanism for a seat backrest according to the present disclosure. As shown in FIGS. 3 to 11, the shoulder adjustment mechanism for a seat backrest according to the present disclosure comprises:

an upper backrest frame 10 and a lower backrest frame 20 in an up-and-down arrangement, each of the upper backrest frame and the lower backrest frame including a first side and a second side opposing to each other in a left-right direction, a third side facing a seat, and a fourth side facing away from the seat;

a pair of first hinges 30 hingedly connected to the first sides and the second sides of the upper backrest frame 10 and the lower backrest frame 20 and close to the third sides;

a pair of second hinges 40 hingedly connected to the first sides and the second sides of the upper backrest frame 10 and the lower backrest frame 20 and close to the fourth sides, the lower backrest frame 20 being provided with sliding grooves 200 for allowing movement of the second hinges 40 (see FIG. 11).

a first base 50 fixed to the first side of the lower backrest frame 20;

a first transmission structure 60 rotatably mounted on the first base 50 and in driving connection with a motor 61, wherein a spacing exists between a rotating position of the first transmission structure 60 and a fixed position of the first base 50;

a first lead screw 70 in transmission connection with the first transmission structure 60, wherein a top portion of the first lead screw 70 is connected with one of the second hinges 40, wherein the motor 61 drives the first lead screw 70 to move up and down through the first transmission structure 60, and accordingly the first lead screw 70 brings the second hinges 40 to move in the sliding grooves, thus realizing rotation of the upper backrest frame 10 about the first hinges 30 relative to the lower backrest frame 20.

Figure 12:
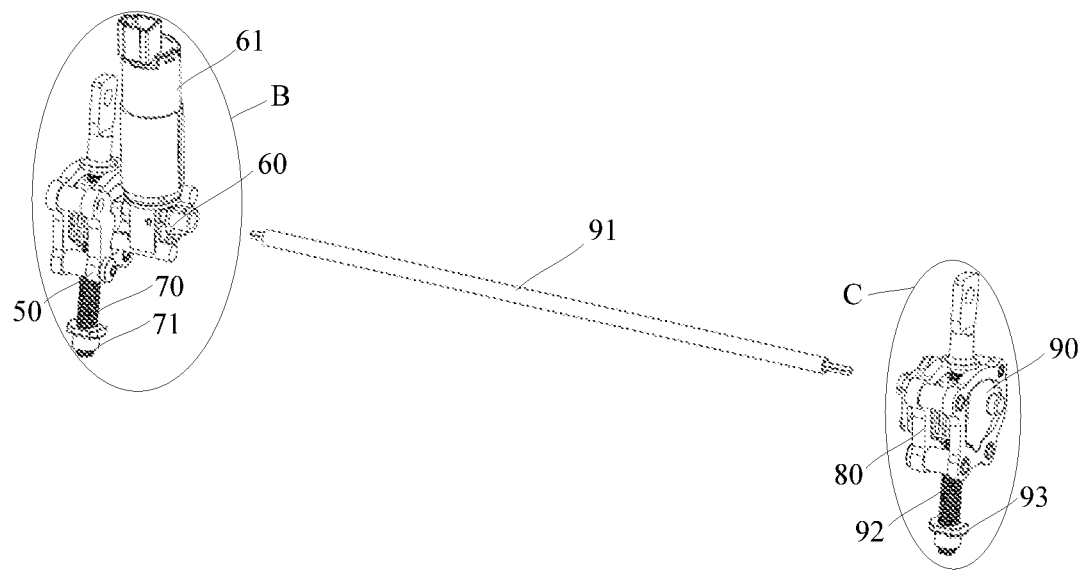
FIG. 12 is a schematic structural view of the shoulder adjustment mechanism for a seat backrest according to the present disclosure, which is not mounted on an upper backrest frame and a lower backrest frame.
Figure 13:
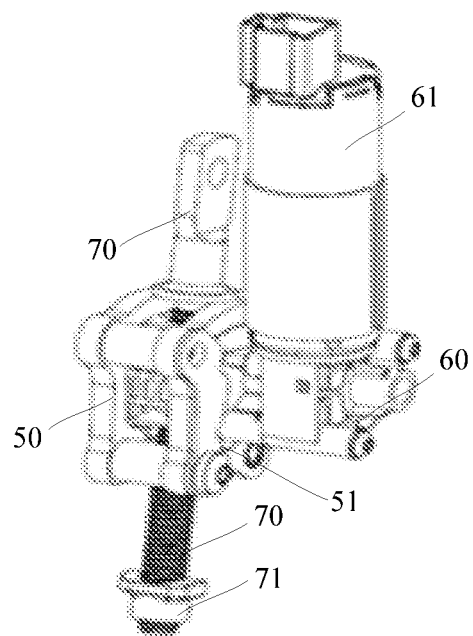
FIG. 13 is an enlarged view of part B of FIG. 12.
Figure 14:
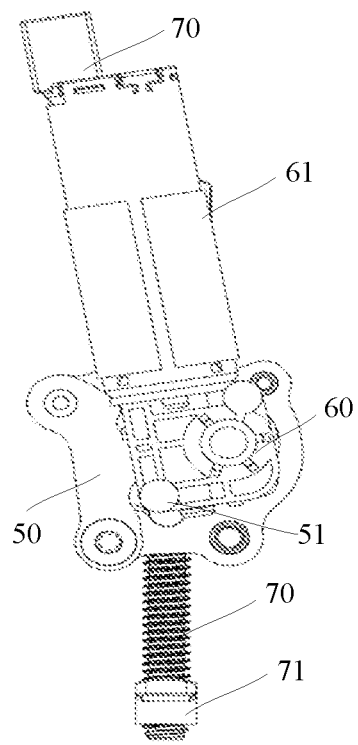
FIG. 14 is a front view of FIG. 13.
Figure 15:
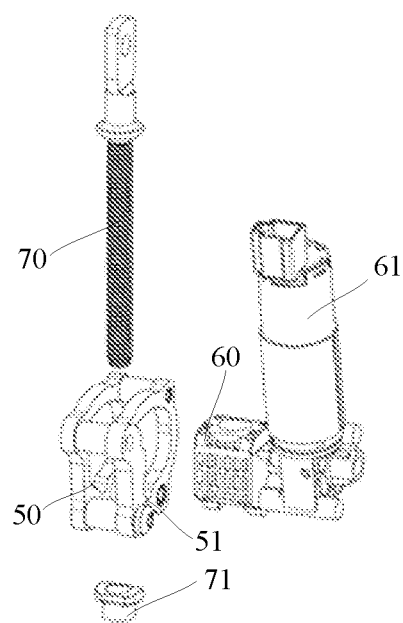
FIG. 15 is an exploded schematic view of FIG. 13.

As a preferred embodiment of the shoulder adjustment mechanism for a seat backrest according to the present disclosure, refer to FIG. 12, which shows a structural schematic view of the shoulder adjustment mechanism for a seat backrest according to the present disclosure that is not mounted on the upper backrest frame and the lower backrest frame. FIG. 13 is an enlarged view of part B of FIG. 12. FIG. 14 is a front view of FIG. 13. FIG. 15 is an exploded schematic view of FIG. 13. As shown in FIGS. 12 to 15, the first base 50 is provided with a first transverse hole in a transverse direction; the first base 50 is provided with a first rotating shaft 51 located on a rim of the first transverse hole; the first transmission structure 60 is placed within the first transverse hole, and an edge of the first transmission structure 60 is in rolling connection with the first rotating shaft 51; the first rotating shaft 51 is a rotating position where the first transmission structure 60 rotates relative to the first base 50. In this embodiment, the first transverse hole is an arc-shaped hole.

In this embodiment, an edge of the first base 50 is fixed to the lower backrest frame 20 through a fixing bolt 52. The fixed position of the first base 50 is the position where the fixing bolt 52 is located. The first rotating shaft 51 and the fixing bolt 52 are not located at the same point, that is, the rotating position of the first transmission structure 60 is spaced from the fixed position of the first base 50, and they do not affect each other. If the adjustment stroke desires to be increased, it only needs to increase the length of the first lead screw 70 without affecting the first base 50 and the first transmission structure 60 and increasing the volume of the first transmission structure 60, so the shoulder adjustment mechanism can adapt to different stroke requirements and has saved space.

As a preferred embodiment of the shoulder adjustment mechanism for a seat backrest according to the present disclosure, the first base 50 is provided with a first vertical hole in a vertical direction and communicating with the first transverse hole; the first transmission structure 60 is provided with a first insertion hole in a vertical direction, and when the first transmission structure 60 is placed within the first transverse hole, the first insertion hole and the first vertical hole correspondingly communicate with each other; the first lead screw 70 penetrates through and placed within the first insertion hole and the first vertical hole. The first insertion hole is formed therein with a thread that is fit for the first lead screw 70. In this embodiment, the first transmission structure 60 is provided therein with a nut, and the first lead screw 70 is inserted into the first transmission structure 60 and is in threaded connection with the nut within the first transmission structure 60. In use, the motor drives the nut in the first transmission structure 60 to rotate through a worm-gear structure, which further brings the first lead screw 70 into up-and-down movement.

In this embodiment, the first lead screw 70 is provided with an external thread. A top portion of the first lead screw 70 is provided with a connecting hole for allowing the second hinge 40 to pass through. In this embodiment, a thread is formed in the connecting hole at the top of the first lead screw 70.

As a preferred embodiment of the shoulder adjustment mechanism for a seat backrest according to the present disclosure, a first nut 71 for limiting position is threadedly connected to a bottom end of the first lead screw 70. The first nut 71 and a top portion of the first base 50 serve as two limiting end points for adjustment of the first lead screw 70.

In this embodiment, the first transmission structure 60 is a first worm-gear structure. When an output shaft of the motor rotates, the first worm-gear structure is driven to work to bring the first lead screw 70 into linear movement.

In this embodiment, both the first hinges 30 and the second hinges 40 are step bolts.

Further, as shown in FIG. 11, two bushings 41 are further included. One bushing 41 is sandwiched between the upper backrest frame 10 and the lower backrest frame 20, and the other bushing 41 is sandwiched between the lower backrest frame 20 and the first lead screw 70. The second hinges 40 pass through the upper backrest frame 10 and the sliding grooves 200 in the lower backrest frame 20, the connecting hole in the first lead screw 70, and the two bushings 41 to achieve hinged connection of the upper backrest frame 10 with the lower backrest frame 20.

Figure 16:
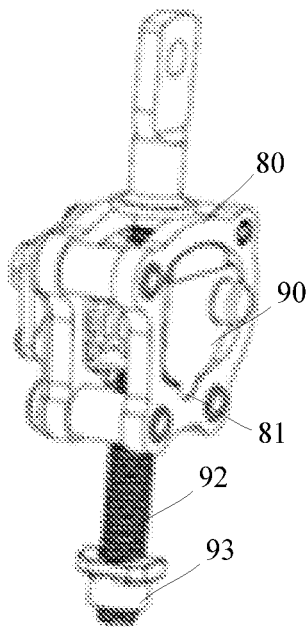
FIG. 16 is an enlarged view of part C of FIG. 12.
Figure 17:
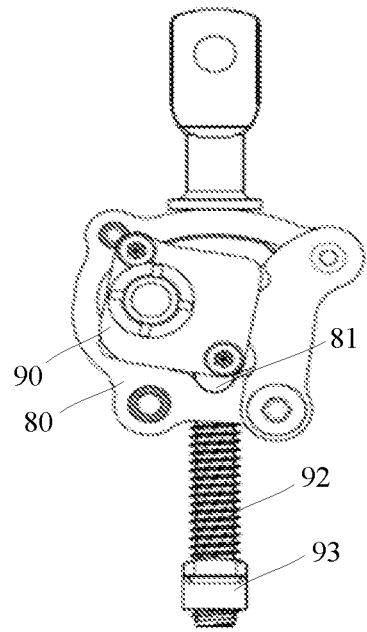
FIG. 17 is a front view of FIG. 16.
Figure 18:
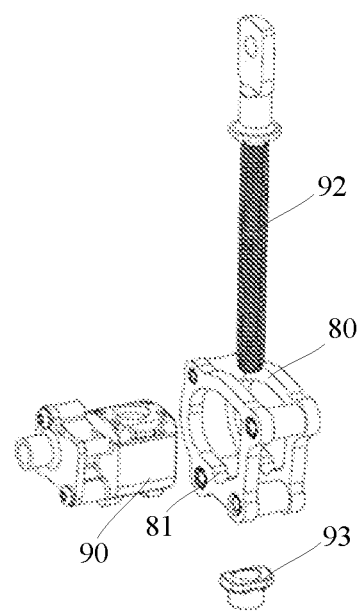
FIG. 18 is an exploded schematic view of FIG. 16.

As a preferred embodiment of the shoulder adjustment mechanism for a seat backrest according to the present disclosure, refer to FIG. 16, which shows an enlarged view of part C of FIG. 12. FIG. 17 is a front view of FIG. 16. FIG. 18 is an exploded schematic view of FIG. 16. As shown in FIGS. 12 to 18, the shoulder adjustment mechanism for a seat backrest according to the present disclosure further includes: a second base 80 fixed to the second side of the lower backrest frame 20; a second transmission structure 90 rotatably mounted on the second base 80, wherein a spacing exists between a rotating position of the second transmission structure 90 and a fixed position of the second base 80; a transverse shaft 91 transversely connected between the first transmission structure 60 and the second transmission structure 90; a second lead screw 92 in transmission connection with the second transmission structure 90 wherein a top portion of the second lead screw 92 is connected with another one of the second hinges 40. In this embodiment, the transverse shaft 91 includes a flexible shaft and a sleeve fitted over the flexible shaft.

As a preferred embodiment of the shoulder adjustment mechanism for a seat backrest according to the present disclosure, the second base 80 is provided with a second transverse hole in a transverse direction; the second base 80 is provided with a second rotating shaft 81 located on a rim of the second transverse hole; the second transmission structure 90 is placed within the second transverse hole, and an edge of the second transmission structure 90 is in rolling connection with the second rotating shaft 81.

As a preferred embodiment of the shoulder adjustment mechanism for a seat backrest according to the present disclosure, the second base 80 is provided with a second vertical hole in a vertical direction and communicating with the second transverse hole; the second transmission structure 90 is provided with a second insertion hole in a vertical direction, and when the second transmission structure 90 is placed within the second transverse hole, the second insertion hole and the second vertical hole correspondingly communicate with each other; the second lead screw 92 penetrates through and placed within the second insertion hole and the second vertical hole.

As a preferred embodiment of the shoulder adjustment mechanism for a seat backrest according to the present disclosure, a second nut 93 for limiting position is threadedly connected to a bottom end of the second lead screw 92. In this embodiment, the second transmission structure 90 is a second worm-gear structure.

The second base 80, the second transmission structure 90 and the second lead screw 92 have the same structures as the first base 50, the first transmission structure 60 and the first lead screw 70. The linkage between two sides of the seat backrest can be realized by means of the transverse shaft 91 transversely connected between the first transmission structure 60 and the second transmission structure 90 to transmit a driving force.

The shoulder adjustment mechanism for a seat backrest according to the present disclosure is beneficial in that:

The seat backrest disclosed in the present disclosure comprises an upper backrest frame and a lower backrest frame in an up-and-down arrangement and hinged together, and a motor is used as a driving source to drive the first transmission structure to move the first lead screw up and down, and accordingly the lead screw brings the upper backrest frame into rotation relative to the lower backrest frame to thereby achieve adjustment of the shoulder.

In the present disclosure, a spacing exists between the rotating position of the first transmission structure and the fixed position of the first base (that is, the rotating point of the first transmission structure is separate from the mounting and fixing point of the first base), and the first lead screw passes through the first transmission structure. In this way, if the stroke needs to be increased, the base and the first transmission structure may not be affected, and there is only a need to increase the length of the first lead screw without increasing the volume of the first transmission structure. This makes the shoulder adjustment mechanism according to the present disclosure adaptable to different stroke requirements and have stronger applicability and saved space, and can achieve the function of shoulder adjustment. In addition, the length of the lead screw can also be adjusted to meet different requirements for different movement strokes of the shoulder adjustment mechanism.

The present disclosure has been described in detail with reference to the attached drawings and embodiments, and those skilled in the art can make various changes to the present disclosure according to the above description. Therefore, some details in the embodiments shall not be construed as limiting the present disclosure, and the scope of protection of the present disclosure will be defined by the appended claims.

What is claimed is:

1. A shoulder adjustment mechanism for a seat backrest, characterized in that the shoulder adjustment mechanism comprises:
    an upper backrest frame and a lower backrest frame in an up-and-down arrangement, each of the upper backrest frame and the lower backrest frame including a first side and a second side opposing to each other in a left-right direction, a third side facing a seat, and a fourth side facing away from the seat;
    a pair of first hinges hingedly connected to the first sides and the second sides of the upper backrest frame and the lower backrest frame and close to the third sides;
    a pair of second hinges hingedly connected to the first sides and the second sides of the upper backrest frame and the lower backrest frame and close to the fourth sides, the lower backrest frame being provided with sliding grooves for allowing movement of the second hinges;
    a first base fixed to the first side of the lower backrest frame through a fixing bolt, wherein a position where the fixing bolt is located forms a fixed position of the first base, and wherein the first base is provided with a first transverse hole in a transverse direction, and the first base is provided with a first rotating shaft located on a rim of the first transverse hole;
    a first transmission structure rotatably mounted within the first transverse hole of the first base and in driving connection with a motor, wherein an edge of the first transmission structure is in rolling connection with the first rotating shaft, so that the first rotating shaft forms a rotating position of the first transmission structure, and wherein a spacing exists between the rotating position of the first transmission structure and the fixed position of the first base; and
    a first lead screw in transmission connection with the first transmission structure, wherein a top portion of the first lead screw is connected with the second hinge, and wherein the motor drives the first lead screw to move up and down through the first transmission structure, and accordingly the first lead screw brings the second hinges to move in the sliding grooves, thus realizing rotation of the upper backrest frame about the first hinges relative to the lower backrest frame.

2. The shoulder adjustment mechanism for a seat backrest according to claim 1, characterized in that,
    the first base is provided with a first vertical hole in a vertical direction and communicating with the first transverse hole;
    the first transmission structure is provided with a first insertion hole in a vertical direction, and when the first transmission structure is placed within the first transverse hole, the first insertion hole and the first vertical hole correspondingly communicate with each other;
    the first lead screw penetrates through and placed within the first insertion hole and the first vertical hole.

3. The shoulder adjustment mechanism for a seat backrest according to claim 1, characterized in that,
    a first nut for limiting position is threadedly connected to a bottom end of the first lead screw.

4. The shoulder adjustment mechanism for a seat backrest according to claim 1, characterized in that,
    the first transmission structure is a first worm-gear structure.

5. The shoulder adjustment mechanism for a seat backrest according to claim 1, characterized in that the shoulder adjustment mechanism further comprises:
    a second base fixed to the second side of the lower backrest frame;
    a second transmission structure rotatably mounted on the second base, wherein a spacing exists between a rotating position of the second transmission structure and a fixed position of the second base;
    a transverse shaft transversely connected between the first transmission structure and the second transmission structure; and
    a second lead screw in transmission connection with the second transmission structure, wherein a top portion of the second lead screw is connected with another one of the second hinges.

6. The shoulder adjustment mechanism for a seat backrest according to claim 5, characterized in that, the second base is provided with a second transverse hole in a transverse direction;

the second base is provided with a second rotating shaft located on a rim of the second transverse hole;

the second transmission structure is placed within the second transverse hole, and an edge of the second transmission structure is in rolling connection with the second rotating shaft.

7. The shoulder adjustment mechanism for a seat backrest according to claim 6, characterized in that, the second base is provided with a second vertical hole in a vertical direction and communicating with the second transverse hole;

the second transmission structure is provided with a second insertion hole in a vertical direction, and when the second transmission structure is placed within the second transverse hole, the second insertion hole and the second vertical hole correspondingly communicate with each other;

the second lead screw penetrates through and placed within the second insertion hole and the second vertical hole.

8. The shoulder adjustment mechanism for a seat backrest according to claim 5, characterized in that, a second nut for limiting position is threadedly connected to a bottom end of the second lead screw.

9. The shoulder adjustment mechanism for a seat backrest according to claim 5, characterized in that, the second transmission structure is a second worm-gear structure.

* * * * *